Nov. 18, 1969     W. J. AUCKLAND     3,478,406

SCREENING SEPARATOR

Filed April 28, 1967

WAYNE J. AUCKLAND
INVENTOR

BY
ATTORNEY

United States Patent Office 3,478,406
Patented Nov. 18, 1969

3,478,406
SCREENING SEPARATOR
Wayne James Auckland, Burlington, Ontario, Canada, assignor to SWECO Inc., Los Angeles, Calif., a corporation of California
Filed Apr. 28, 1967, Ser. No. 634,526
Int. Cl. B07b 1/32
U.S. Cl. 209—334        6 Claims

ABSTRACT OF THE DISCLOSURE

A vibratory separator in which a circular screen is vibrated by an eccentric for the separation of material into 2 components which have an impact-producing means which may consist of metal spheres in a container and which is actuated by the vibratory means to impart impacts to the screen.

---

This invention relates to vibratory separators of the type useful in separating solids of different sizes and separating solids from liquids. The present invention is particularly concerned with means and methods for improving the operation of the screens in such a device so as to prevent the screens from becoming clogged by being coated with material or by virtue of oversize material being stuck thereto.

Although a horizontal screen vibratory separating device of the type disclosed, for example, in U.S. Patents 3,035,700; 3,156,643; 3,029,946; 2,777,578; 2,753,999; 2,714,961; 2,696,302; 2,676,706 and 2,284,671 gives a great deal of flexibility in the separation of material by the selection of proper screen size and the appropriate adjustment of the vibrating device which drives it, there have been certain applications in which the vibratory screen apparatus has not been as successful as it might be.

For example, ordinary wheat flour, when finely ground has a tendency to blind the screen; that is, a portion of the flour will stick to the screen wires and eventually bridge over the screen holes so that the flow rate of flour particles through the screen is impaired and the unit eventually becomes clogged. Similarly, such materials as fine zinc powder and finely ground adipic acid periodically give rise to operational difficulties in the vibrating screen separator.

It has been proposed that when a vibratory separator is employed to remove finely divided solids from relatively larger solids or liquid, different modes of vibratory motion be imparted to the shaking screen to aid in preventing the particulate material to be separated from clogging the screen.

It is therefore an object of this invention to provide an improved vibratory separator, which separator employs a circular screen and, when subject to vibration, is useful in the separation of mixtures of solids of different sizes as well as liquid-solid mixtures.

It is another object of this invention to provide a vibratory screening apparatus particularly adapted to the separation of finely divided solids from relatively larger solids or from liquids.

It is a further object of this invention to provide an improved vibratory separator employing a means to impart a second mode of different vibratory motion to the shaking screen.

It is still a further object of this invention to provide a vibratory separator, which separator employs a means for increasing the "through-put" efficiency of vibratory separator screens which are subject to high frequency vibrations.

Yet another object of the invention is to provide an improved vibratory separator unit which can be operated for longer intervals without the necessity of shutdown for screen cleaning as required on certain difficult separating operations.

Figure 1:
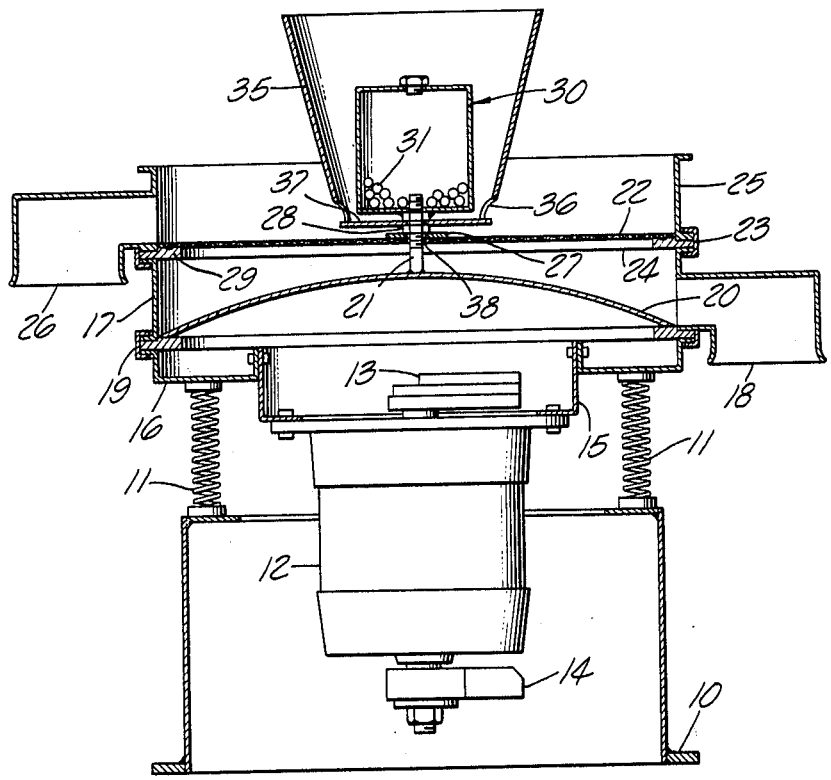
Figure 2:
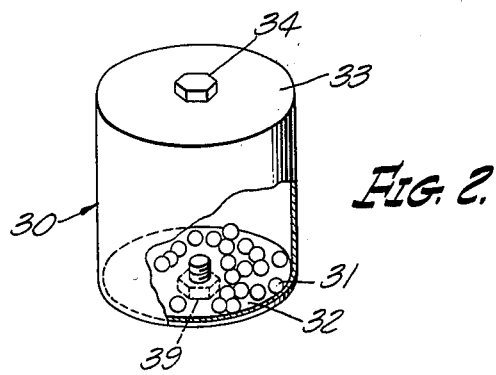

With the above objects in mind and other objects which may hereinafter appear, reference is directed to the drawings accompanying the specification in which:

FIGURE 1 is a vertical cross section view of a vibratory screening apparatus having a circular configuration; and FIGURE 2 is a partially cutaway perspective of the means of this invention for improving the performance of the screen.

The above and other objects of this invention are in part accomplished by a vibratory separator which comprises generally a cylindrical housing structure, a planar screen attached to receive material to be separated; vibrating means for vibrating the housing structure and the screen to cause the movement of material across the screen, the liquid or undersize material passing through the screen, the oversize or solid material moving across the screen for discharge therefrom, and means positioned above the approximate center of the screen and operatively associated therewith to impart a random and different vibration to the screen than that imparted by the vibrating means, the last mentioned means being actuated by the vibrating means.

The additional means to impart the random and different vibration to the screen are basically impact-producing means arranged to be freely movable in a container therefor which is positioned above the screen and which is so arranged to communicate impacts therein produced to the screen itself.

The vibratory shaking or screening device (as shown in FIGURE 1) consists of a base frame 10 on the upper portion of which is mounted a ring of springs 11 which mechanically separate the base frame 10 from the vibratory screening device. A vibratory unit comprising a motor 12 and upper and lower eccentric weights 13 and 14 respectively, is mounted by means of the mounting brackets 15 to the upper base 16 which is supported on the ring of springs 11. The relationship of the vibratory unit and the base frame 10, as described above, may be varied by other arrangements. For example, a motor may be mounted upon the base frame 10. A belt drive from such motor extends to and rotates the eccentric weights which are mounted on the upper base 16. On the upper base frame 16 is mounted a cylindrical frame 17 having a discharge spout 18 at one side thereof. At the bottom of this cylindrical section 17 is a clamp ring member 19 and the outer periphery of a dish-shaped collector pan 20. At the center of the collector pan 20 is a center post 21 is employed to tension the shaking screen 24. The shaking screen 24 is fastened in a tension ring 29 which fits between frame 17 and upper frame 25. A clamp ring 23 secures the frames 17 and 25, tension ring 29, and screen 22, the bottom peripheral portion of which is shown at 24. The frame 25 also has a discharge port 26 on one side. The screen member 22 is tensioned in the tension ring 29 prior to installation and then tension is completed by the center post 21, washer 27 and threadably attached lock nut 28 which project through the screen 22 at the reinforced hole 38.

As above described, the apparatus functions to separate materials of two different sizes through the screen 22 by virtue of the vibratory motion imparted by the vibrating unit 12 including the upper and lower eccentric weights 13 and 14. As material to be separated is fed through the upper screen 22, the vibratory motion causes the material to move along the screen 22; the oversize portion of the material being discharged through the discharge port 26. Material falling through the screen 22 falls onto the dish shaped tensioning member or table dome assembly 20 and is ultimately discharged through the discharge port 18. Although this device gives a great deal of flexibility in the separation of material by the selection of proper screen size and the appropriate adjustment of the eccentric weights 13 and 14, both with respect to the quantity of weight and the "lead angle" (i.e., the angular displacement of the lower weight 14 from the upper weight 13), as previously mentioned, there have been certain applications in which the vibartory screening apparatus has been relatively unsuccessful.

By attaching a hollow cylindrical member 30 to the uppermost portion of the center post 21 and partially filling such member with freely moving metallic spheres 31 which are allowed to impinge against each other and against the side wall of the cylindrical container 30 during vibraiton of the machine, the problems connected with the vibratory sifting of flour, zinc powder and adipic acid and other fine materials which tend to "blind" the screen 24 are substantially overcome.

The device of this invention is one of its embodiments is shown in FIGURE 2, in which figure the side wall has been partially cut away. The container 30 has cylindrical side walls and flat top and bottom walls 33 and 32. In order to permit assembly of the container 30 on the center post 21 (FIGURE 1) a hole is cut through the bottom wall 32 and the container 30 is mounted on the center post 21 to be held in place by the nut 39. In order to permit the container 30 to be filled, a hole is likewise formed in the top portion 33 and, after the unit is assembled and the spheres 31 added, the hole is plugged with a threaded bolt 34.

In practice, the cylindrical container 30 should be filled to form a fraction of its height to less than full with the metallic spheres 31 used to impart random motion to the vibratory screen 22.

The metallic balls 31 may be of any convenient size such as from 3/16" diameter to about 7/8" diameter so long as the container 30 is not completely filled with the spheres 31 and sufficient room is maintained in the cylindrical container 30 for free impingement of the spheres 31, one against the other and against the side wall of the container 30.

It is to be noted that the spheres 31 must be of a hard, preferably metallic, material such as steel in order that they perform their intended function of preventing screen blinding to improve the efficiency of operation of the screening mechanism when used in the service of separating formerly hard to separate powdered material.

Because the imparted motions to the vibratory unit as above described causes the material upon the screen 22 to move from the center portion toward the outside peripheral discharge port 26, it is advantageous to the operational efficiency of the separator to feed material onto the central area of the screen 22.

Therefore, the device of this invention may alternatively be provided with a conical center feed mechanism 35 which is likewise attached to the center post 21. Alternatively, the feed cone 35 may be attached to the material feed system (not shown). However, when attached to the center post 21, the feed cone 35 may be provided with a plurality of ports or holes 36 at or near its bottom 37 and then the conical feed member 35 may have a flat bottom 37 with a receiving hole for the center post 21.

In certain vibratory screening apparatuses the center post 21 is not present. In these devices, some other means than the center post 21 and spherical dish 20 are employed to perfect the center tensioning of the screen 22. In this form of the apparatus, the cylindrical container 30 and asociated steel spheres 31 may be positioned above the center of the screen 22 by radiating struts (not shown) affixed to the tension ring 29 or cylindrical side walls 25. In this way, the vibratory motion caused by the impingement of the spheres 31 against each other and against the side wall of the container 30 can be imparted to the screen 22 even in the absence of the center post 21.

While it is not immediately obvious that the provision of the cylindrical container 30 and the metal spheres 31 will have any appreciable effect on the operation of the vibratory screen, it has been found in operation to have a substantial effect on both the throughput rate and the length of time during which the screening mechanism can operate without shutdown for clean-out when the device is used on certain difficult to separate materials. The apparent reason, although uncertain, is that the metal spheres 31 by impinging against the container 30 impart a different mode of vibratory motion (perhaps random) against the center post 21 which in turn translates this vibratory motion to the screen 22 and provides a more efficient method for vibrating the screen 22 to prevent blinding than has been achieved in prior art devices.

I claim:
1. A vibratory separator, comprising
  a cylindrical housing structure,
  a planar screen adapted to receive material to be separated,
  a center post for supporting said screen,
  vibratory means for vibrating said housing structure and said screen to cause the movement of said material on said screen for discharge therefrom of the oversize component of said material, and
  impact-producing means comprising a plurality of metallic spheres arranged to be freely movable and a container for said impact-producing means, said container being a generally cylindrical container positioned above said screen and being supported on said center post and arranged to communicate impacts to said screen, said impact-producing means being actuated by said vibrating means.

2. The apparatus of claim 1 wherein said center post has associated therewith conical feed means for directing material to be separated to the center of said screen.

3. A vibratory separator, comprising
  a cylindrical housing structure,
  a planar screen adapted to receive material to be separated,
  a center post for supporting said screen,
  vibratory means for vibrating said housing structure and said screen to cause the movement of said material on said screen for discharge therefrom of the oversize component of said material, and
  impact-producing means arranged to be freely movable and a container for said impact-producing means, said container positioned above said screen and being supported on said center post and arranged to communicate impacts to said screen, said impact-producing means being actuated by said vibrating means.

4. The apparatus of claim 3 in which said impact-producing means comprise a plurality of metallic spheres.

5. The apparatus of claim 4 in which said container is a generally cylindrical container positioned above said screen.

6. The apparatus of claim 5 in which said container is less than filled with said spheres, and said spheres are balls having a diameter of from approximately three-sixteenths inch to approximately seven-eighths inch.

References Cited

UNITED STATES PATENTS

| | | | |
|---|---|---|---|
| 142,729 | 9/1873 | Reynolds | 209—330 X |
| 507,971 | 10/1893 | Combs | 209—330 X |
| 1,120,012 | 12/1914 | Bell | 209—328 X |
| 1,152,650 | 9/1915 | Luxmore | 209—323 |
| 1,028,867 | 6/1912 | Emerick | 241—60 |
| 1,576,616 | 3/1926 | Pharo | 209—330 X |
| 2,212,818 | 8/1940 | Stoltzfus | 209—366.5 X |

FOREIGN PATENTS

| | | |
|---|---|---|
| 612,987 | 2/1934 | Germany. |
| 779,008 | 1/1935 | France. |
| 1,000,666 | 1/1957 | Germany. |
| 1,192,035 | 4/1965 | Germany. |

HARRY B. THORTON, Primary Examiner

ROBERT HALPER, Assistant Examiner

U.S. Cl. X.R.

209—366.5